United States Patent
Lu

(10) Patent No.: US 12,293,044 B2
(45) Date of Patent: May 6, 2025

(54) TOUCH STRUCTURE AND TOUCH DISPLAY PANEL

(71) Applicant: TCL China Star Optoelectronics Technology Co., Ltd., Shenzhen (CN)

(72) Inventor: Zhitao Lu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/620,789

(22) PCT Filed: Dec. 10, 2021

(86) PCT No.: PCT/CN2021/136935
§ 371 (c)(1),
(2) Date: Dec. 20, 2021

(87) PCT Pub. No.: WO2023/092684
PCT Pub. Date: Jun. 1, 2023

(65) Prior Publication Data
US 2024/0427457 A1 Dec. 26, 2024

(30) Foreign Application Priority Data
Nov. 24, 2021 (CN) .......................... 202111401202.3

(51) Int. Cl.
*G06F 3/041* (2006.01)
*G06F 3/044* (2006.01)

(52) U.S. Cl.
CPC ...... *G06F 3/04186* (2019.05); *G06F 3/04164* (2019.05); *G06F 3/04166* (2019.05); *G06F 3/044* (2013.01); *G06F 2203/04107* (2013.01)

(58) Field of Classification Search
None
See application file for complete search history.

(56) References Cited

U.S. PATENT DOCUMENTS

2016/0266694 A1* 9/2016 Lee ..................... G06F 3/04166
2019/0346944 A1 11/2019 Gallardo et al.
(Continued)

FOREIGN PATENT DOCUMENTS

| CN | 104182099 A | 12/2014 |
| CN | 104808867 A | 7/2015 |

(Continued)

OTHER PUBLICATIONS

International Search Report in International application No. PCT/CN2021/136935, mailed on Jul. 27, 2022.
(Continued)

*Primary Examiner* — Nicholas J Lee
(74) *Attorney, Agent, or Firm* — PV IP PC; Wei Te Chung

(57) ABSTRACT

A touch structure and a touch display panel are disclosed. The touch structure includes a plurality of touch units, a plurality of touch row selection lines, and a plurality of touch column readout lines. One of the touch column readout lines is configured using one column of the touch units, and required touch signals can be read out using only N touch column readout lines. In addition, one of the touch row selection lines is electrically connected to one row of the touch units. Therefore, the required touch signals may be read row by row, thereby avoiding the ghosting.

16 Claims, 12 Drawing Sheets

(56) References Cited

U.S. PATENT DOCUMENTS

2021/0351170 A1    11/2021   Liu et al.
2022/0269375 A1*   8/2022    Li .......................... G06F 3/0446

FOREIGN PATENT DOCUMENTS

| CN | 105677112 A | 6/2016 |
| CN | 111355901 A | 6/2020 |
| CN | 112650416 A | 4/2021 |
| CN | 112882609 A | 6/2021 |
| CN | 113157136 A | 7/2021 |
| CN | 113655919 A | 11/2021 |

OTHER PUBLICATIONS

Written Opinion of the International Search Authority in International application No. PCT/CN2021/136935, mailed on Jul. 27, 2022.
Chinese Office Action issued in corresponding Chinese Patent Application No. 202111401202.3 dated Aug. 18, 2023, pp. 1-9.

* cited by examiner

TOUCH STRUCTURE AND TOUCH DISPLAY PANEL

CROSS-REFERENCE TO RELATED APPLICATION

This application is a national phase application under 35 U.S.C. § 371 of PCT Application No. PCT/CN2021/136935, filed Dec. 10, 2021, which claims priority to Chinese Application No. 202111401202.3, filed Nov. 24, 2021, the contents of which are incorporated herein by reference in their entirety.

FIELD OF INVENTION

The present disclosure relates to the field of display technologies, and in particular, to a touch structure and a touch display panel.

BACKGROUND OF INVENTION

The integrated touch sensing performance of the display panel can bring more diverse and more convenient user experience. The projected capacitive touch screen is mainly used in the market today, which is divided into a self-capacitance touch screen and a mutual-capacitance touch screen.

As shown in FIGS. 1 and 2, the self-capacitance touch screen includes a plurality of touch electrodes 1, and each of the touch electrodes 1 has a capacitance CP to the ground. When a human hand is approaching the corresponding touch electrode 1, a sensing capacitance CF between the human hand and the touch electrode 1 may change, so as to determine the touch position.

As shown in FIGS. 3 and 4, the mutual-capacitance touch screen includes a plurality of driving electrodes 2 and sensing electrodes 3, and a capacitance CM exists between the driving electrode 2 and the sensing electrode 3 that are adjacent to each other. When a human hand approaches the touch screen, corresponding sensing capacitances CF2 and CF3 are generated between the human hand and the corresponding driving electrode 2 and sensing electrode 3. In this way, the magnitude of the capacitance CM is changed, and the corresponding touch position can be determined according to the variation of the capacitance CM.

Under normal circumstances, the touch accuracy of the self-capacitance touch screen is higher than that of the mutual-capacitance touch screen. The touch signals in a passive self-capacitance touch screen are mostly read using the two methods below.

The first reading method shown in FIG. 5 is as follows. Touch electrodes in an array distribution may be divided into M rows of touch electrodes in rows, for example, an $X1^{th}$ row of touch electrodes, an $X2^{nd}$ row of touch electrodes, an $X3^{th}$ row of touch electrodes, an $X4^{th}$ row of touch electrodes, and an $XM^{th}$ row of touch electrodes. Similarly, the touch electrodes may be divided into N columns of touch electrodes in columns, for example, a $Y1^{th}$ column of touch electrodes, a $Y2^{nd}$ column of touch electrodes, a $Y3^{th}$ column of touch electrodes, a $Y4^{th}$ column of touch electrodes, and a $YN^{th}$ column of touch electrodes.

The touch electrodes distributed in the array read the touch signals horizontally and vertically, respectively, so as to determine the abscissae and the ordinates of the touch points. However, when there is multi-touch, for example, when a touch event occurs on the touch electrode 4 and the touch electrode 6 simultaneously, two abscissae X2, X3 and two ordinates Y2, Y3 are to be read out, and therefore four points are to be identified. Ghosting without touch events occurs on both the touch electrode 5 (X2, Y3) and the touch electrode 7 (X3, Y2). Moreover, the reading method shown in FIG. 5 requires M+N touch signal reading lines.

The second reading method shown in FIG. 6 is as follows. Touch electrodes in an array distribution may be divided into M rows of touch electrodes in rows, for example, an $X1^{th}$ row of touch electrodes, an $X2^{nd}$ row of touch electrodes, an $X3^{th}$ row of touch electrodes, an $X4^{th}$ row of touch electrodes, and an $XM^{th}$ row of touch electrodes. Similarly, the touch electrodes may be divided into N columns of touch electrodes in columns, for example, a $Y1^{th}$ column of touch electrodes, a $Y2^{nd}$ column of touch electrodes, a $Y3^{th}$ column of touch electrodes, a $Y4^{th}$ column of touch electrodes, and a $YN^{th}$ column of touch electrodes.

The difference from FIG. 5 is that the touch signal readout line of each touch unit in FIG. 6 is drawn out separately, so that the sensing accuracy is high and there is no ghosting. However, the method has a lot of traces and requires M*N touch signal readout lines. Especially for large-size screens, the integration method and signal readout are very difficult.

Therefore, although self-capacitance touch has high accuracy and can be operated with wet hands, the inability of multi-touch caused by ghosting and the requirement for more touch signal readout lines severely restrict the further development and application of the self-capacitance touch technology.

It should be noted that the above introduction of the background technology is only to facilitate a clear and complete understanding of the technical solutions of the present disclosure. Therefore, it cannot be considered that the above technical solutions involved are known to those skilled in the art just because the technical solutions appear in the background art of the present disclosure.

SUMMARY OF INVENTION

Technical Problem

The present disclosure provides a touch structure and a touch display panel to alleviate the technical problem of ghosting in self-capacitance touch and requiring a relatively large number of touch signal readout lines.

Technical Solution

In a first aspect, the present disclosure provides a touch structure. The touch structure includes a plurality of touch units, a plurality of touch row selection lines, and a plurality of touch column readout lines, wherein the plurality of touch units are distributed in an array; one of the touch row selection lines is electrically connected to one row of the touch units; and one of the touch column readout lines is electrically connected to one column of the touch units.

In some implementations, each touch unit includes a first transistor, a touch metal block, and a second transistor, wherein a source electrode of the first transistor is configured to receive a corresponding electric drive signal; the touch metal block is electrically connected to a gate electrode of the first transistor or a drain electrode of the first transistor; and a source electrode of the second transistor is electrically connected to the drain electrode of the first transistor, a gate electrode of the second transistor is electrically connected to a corresponding one of the touch row selection lines, and a drain electrode of the second transistor is electrically connected to a corresponding one of the touch column readout lines.

In some implementations, the electric drive signal is a square wave touch drive signal, the touch metal block is electrically connected to the gate electrode of the first transistor, and the source electrode of the first transistor and the gate electrode of the first transistor at least partially overlap in a thickness direction of the touch structure to form a first parasitic capacitance; and the drain electrode of the first transistor and the first metal block at least partially overlap in the thickness direction to form a second parasitic capacitance, and the first metal block and the gate electrode of the first transistor are located in a same film layer.

In some implementations, the gate electrode of the first transistor and the first metal block are formed in a first gate layer, the touch metal block is formed in a first metal layer, and the touch metal block and the gate electrode of the first transistor at least partially overlap in the thickness direction.

In some implementations, the first transistor is a photosensitive transistor, the gate electrode of the first transistor is configured to sense a light-control signal, the electric drive signal is a constant voltage direct current (DC) signal, and the touch metal block is electrically connected to the source electrode of the first transistor.

In some implementations, the gate electrode of the first transistor and the gate electrode of the second transistor are formed in a second gate layer; the drain electrode of the first transistor, the source electrode of the first transistor, the drain electrode of the second transistor, the source electrode of the second transistor, and the touch column readout lines are formed in a second metal layer; and the touch metal block is formed in the transparent electrode layer, and a projection of the touch metal block on the second gate layer is located between the gate electrode of the first transistor and the gate electrode of the second transistor.

In some implementations, the touch structure further includes a light-shielding metal layer. The light-shielding metal layer includes a plurality of light-shielding metal blocks isolated from each other, the light-shielding metal blocks and a second active layer at least partially overlap in a thickness direction, and one of the light-shielding metal blocks is electrically connected to the drain electrode of the first transistor or the drain electrode of the second transistor.

In some implementations, the touch unit further includes an integrating amplifier module, wherein an inverting input terminal of the integrating amplifier module is electrically connected to the source electrode of the second transistor, a non-inverting input terminal of the integrating amplifier module is configured to receive a reference voltage signal, and an output terminal of the integrating amplifier module is electrically connected to a corresponding one of the touch column readout lines.

In some implementations, the integrating amplifier module includes an amplifier, an integrating capacitor, and a reset switch, wherein an inverting input terminal of the amplifier is electrically connected to the source electrode of the second transistor, a non-inverting input terminal of the amplifier is configured to receive the reference voltage signal, and an output terminal of the amplifier is electrically connected to a corresponding one of the touch column readout lines; one end of the integrating capacitor is electrically connected to the inverting input terminal of the amplifier, and an other end of the integrating capacitor is electrically connected to the output terminal of the amplifier; and one end of the reset switch is electrically connected to the one end of the integrating capacitor, and an other end of the reset switch is electrically connected to the other end of the integrating capacitor.

In a second aspect, the present disclosure provides a touch display panel. The touch display panel includes the touch structure in at least one implementation described above.

In some implementations, the touch display panel includes a display area and a touch area that are alternately distributed, wherein the touch structure is disposed in the touch area.

In some implementations, the touch display panel includes a display panel and a touch panel, wherein the touch panel is disposed on a light-exit side of the display panel and includes the touch structure.

Beneficial Effects

According to the touch structure and the touch display panel provided in the present disclosure, one of the touch column readout lines is configured using one column of the touch units, and required touch signals can be read out using only N touch column readout lines, thereby reducing a quantity of touch signal readout lines. In addition, one of the touch row selection lines is electrically connected to one row of the touch units, and the required touch signals can be read out row by row, so that only the touch signal of one touch unit in the row can be read out using one of the touch column readout lines at a same moment, avoiding the ghosting.

DETAILED DESCRIPTION OF PREFERRED EMBODIMENTS

To make the objectives, technical solutions, and effects of the present disclosure clearer and more specific, the following further describes the present disclosure in detail with reference to the accompanying drawings and embodiments.

It should be understood that the specific embodiments described herein are only used to describe the present disclosure, instead of limiting the present disclosure.

Figure 1:
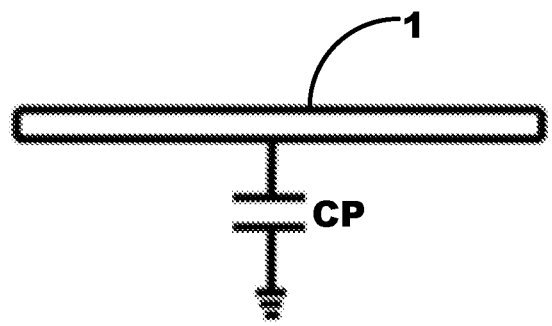
FIG. 1 is a schematic diagram of a structure of self-capacitance touch.
Figure 2:
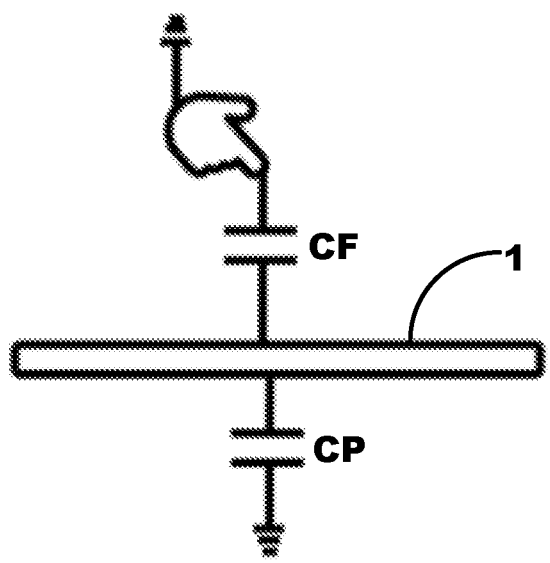
FIG. 2 is a schematic diagram of a structure of operation by self-capacitance touch in FIG. 1.
Figure 3:
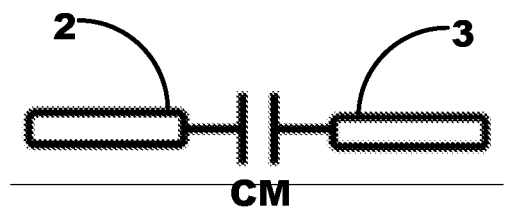
FIG. 3 is a schematic diagram of a structure of mutual-capacitance touch.
Figure 4:
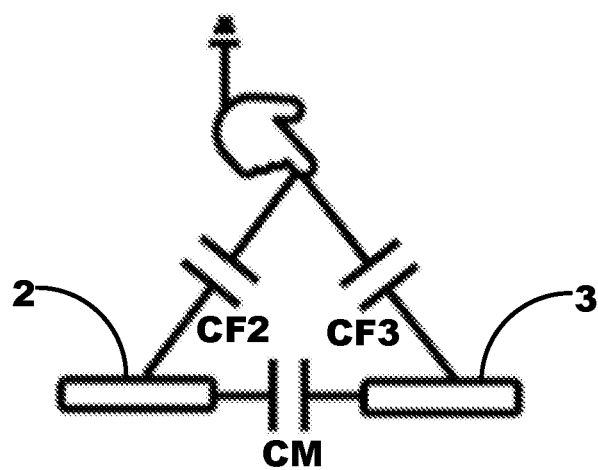
FIG. 4 is a schematic diagram of a structure of operation by mutual-capacitance touch in FIG. 3.
Figure 5:
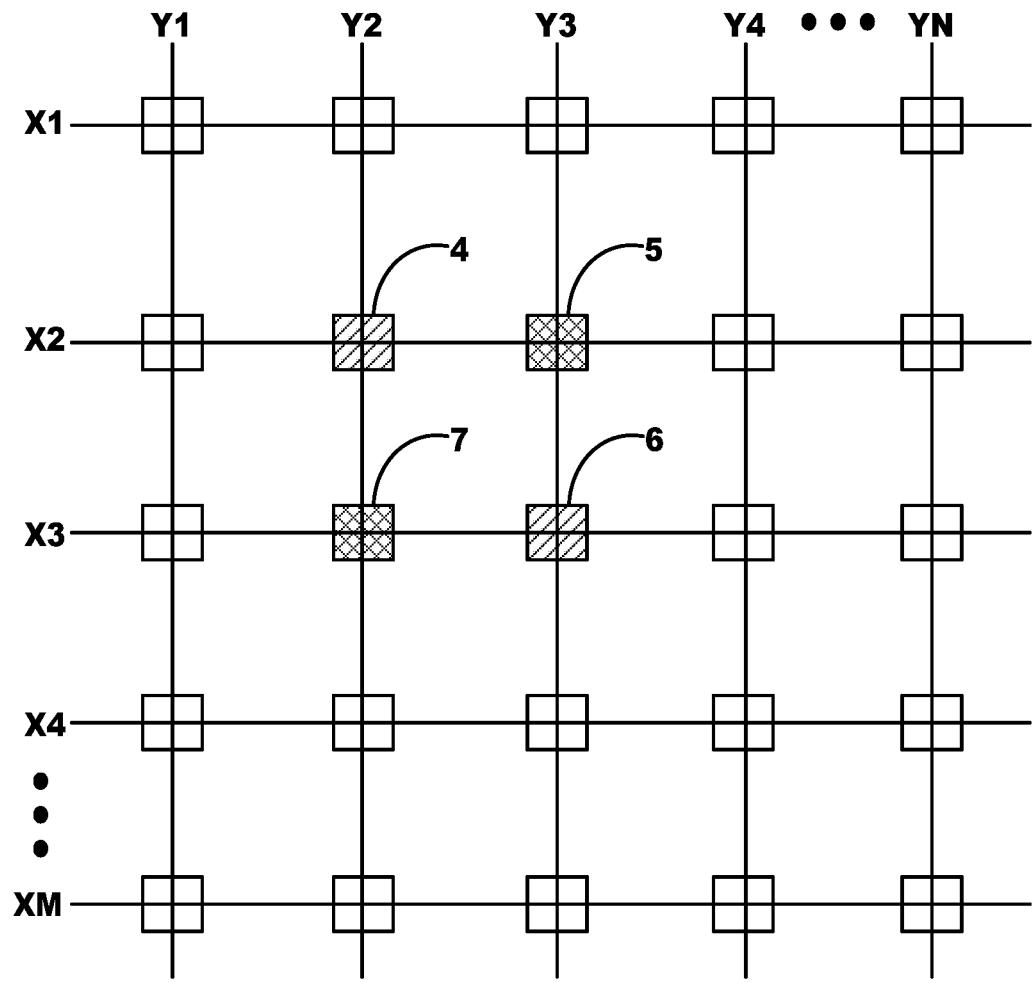
FIG. 5 is a schematic diagram of a structure of a touch screen in a traditional technical solution.
Figure 6:
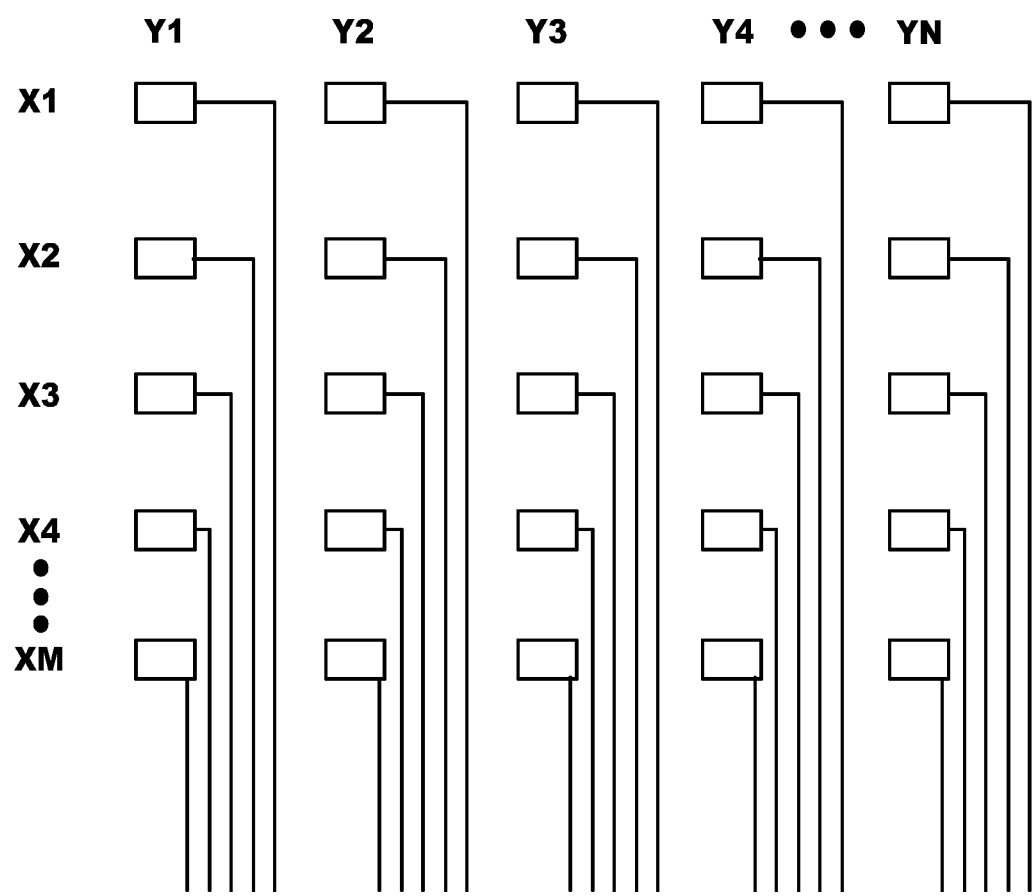
FIG. 6 is a schematic diagram of another structure of a touch screen in a traditional technical solution.
Figure 7:
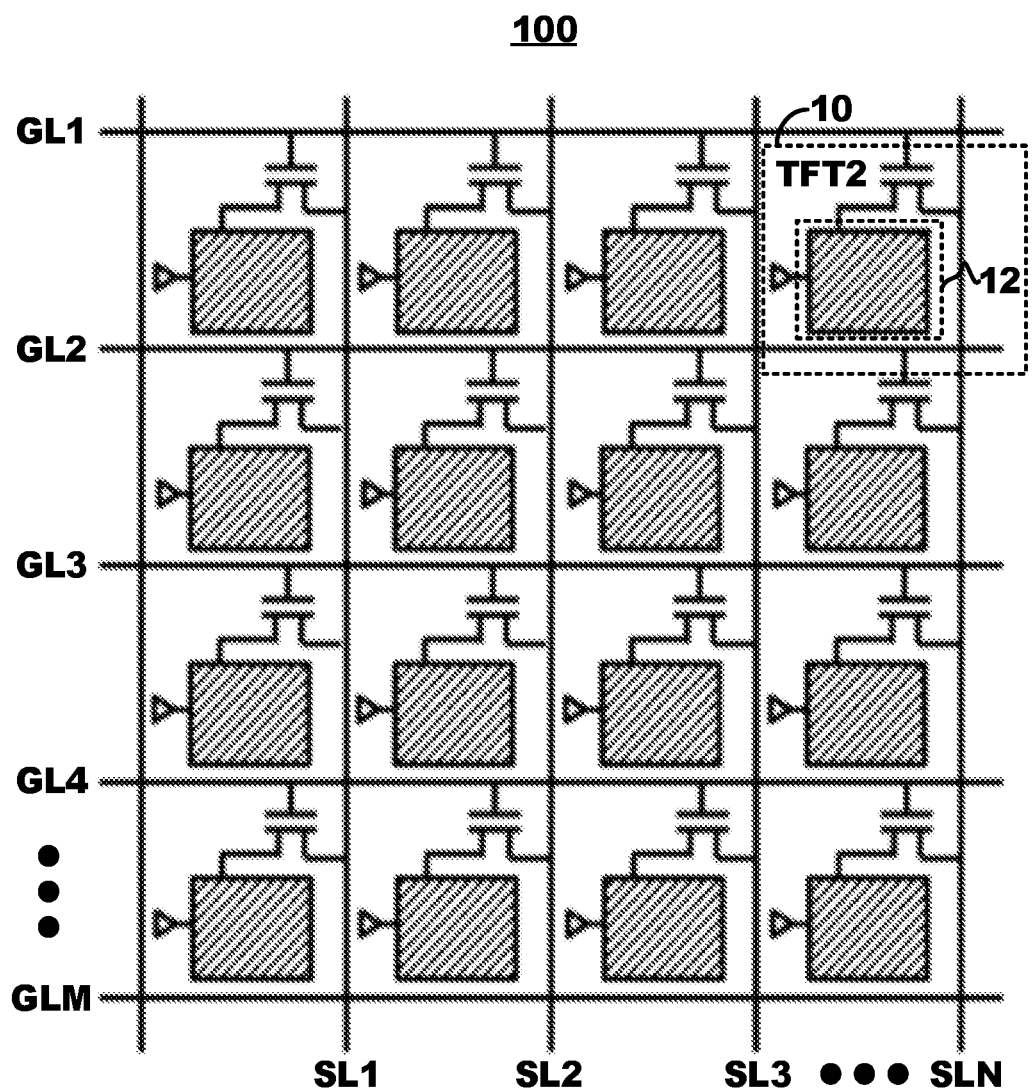
FIG. 7 is a schematic diagram of a touch structure according to an embodiment of the present disclosure.

Referring to FIG. 7 to FIG. 13, as shown in FIG. 7, the present embodiment provides a touch structure 100. The touch structure includes a plurality of touch units 10, a plurality of touch row selection lines, and a plurality of touch column readout lines. The plurality of touch units 10 are distributed in an array. One of the touch row selection lines is electrically connected to one row of the touch units 10. One of the touch column readout lines is electrically connected to one column of the touch units 10.

It may be understood that, according to the touch structure 100 provided in the present embodiment, one of the touch column readout lines is configured using one column of the touch units 10, and required touch signals can be read out using only N touch column readout lines, thereby reducing a quantity of touch signal readout lines. In addition, one of the touch row selection lines is electrically connected to one row of the touch units 10, and the required touch signals can be read out row by row, so that only the touch signal of one touch unit 10 in the row can be read out using one of the touch column readout lines at a same moment, avoiding the ghosting.

It should be noted that, in the present embodiment, the touch unit 10 includes a touch substructure 12 and a second transistor TFT2, and a drain electrode of the second transistor TFT2 is directly electrically connected to a corresponding one of the touch column readout lines.

The plurality of touch row selection lines may include a touch row selection line GL1, a touch row selection line GL2, a touch row selection line GL3, a touch row selection line GL4, and a touch row selection line GLM. The touch row selection line GL1 may be electrically connected to the touch units 10 in a first row, the touch row selection line GL2 may be electrically connected to the touch units 10 in a second row, the touch row selection line GL3 may be electrically connected to the touch units 10 in a third row, the touch row selection line GL4 may be electrically connected to the touch units 10 in a fourth row, and the touch row selection line GLM may be electrically connected to the touch units 10 in an $M^{th}$ row. The plurality of touch column readout lines may include a touch column readout line SL1, a touch column readout line SL2, a touch column readout line SL3, and a touch column readout line SLN that extend in a vertical direction and arranged in a horizontal direction. The touch column readout line SL1 may be electrically connected to the touch units 10 in a first column, the touch column readout line SL2 may be electrically connected to the touch units 10 in a second column, the touch column readout line SL3 may be electrically connected to the touch units 10 in a third column, and the touch column readout line SLN may be electrically connected to the touch units 10 in an N column.

Figure 8:
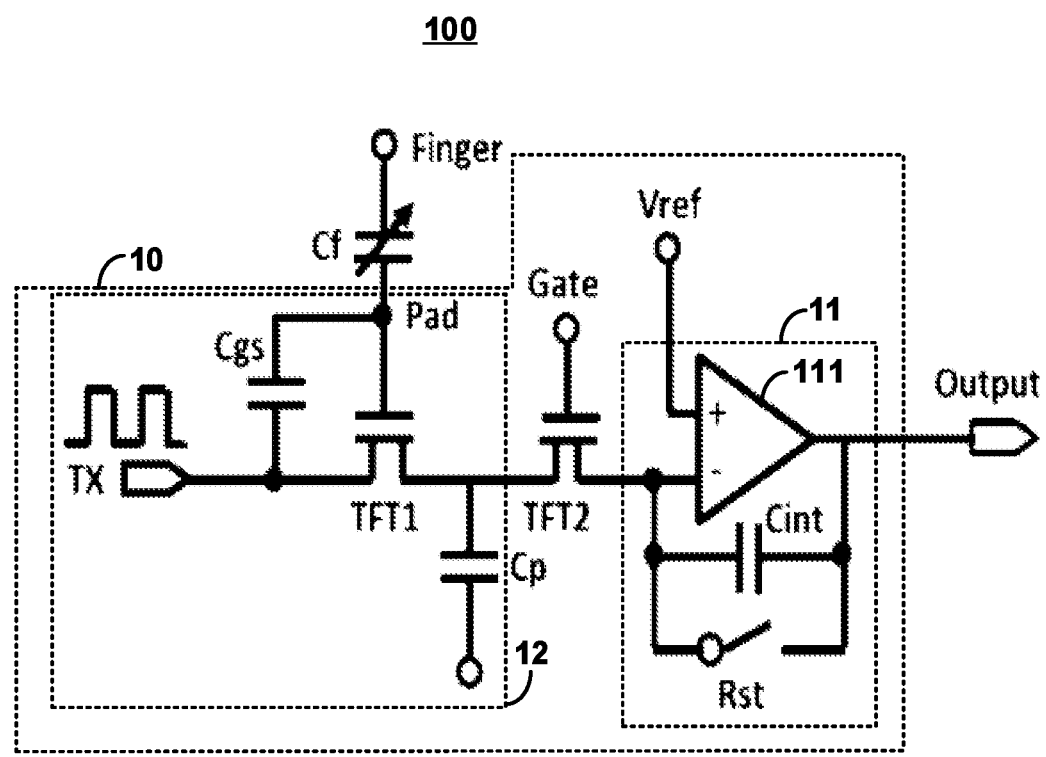
FIG. 8 is an equivalent circuit diagram of a touch unit in FIG. 7.

FIG. 8 is another equivalent circuit diagram of the touch unit 10 in other embodiments of the present invention. A difference between the circuit diagram of the touch unit 10 shown in FIG. 8 and the circuit diagram of the touch unit 10 shown in FIG. 7 is that: compared with the drain electrode of the second transistor TFT2 in FIG. 7 that is directly electrically connected to a corresponding one of the touch column readout lines, the touch unit 10 in the present embodiment further includes an integrating amplifier module 11 shown in FIG. 8, and the drain electrode of the second transistor TFT2 is electrically connected to a corresponding one of the touch column readout lines using the integrating amplifier module 11.

Figure 9:
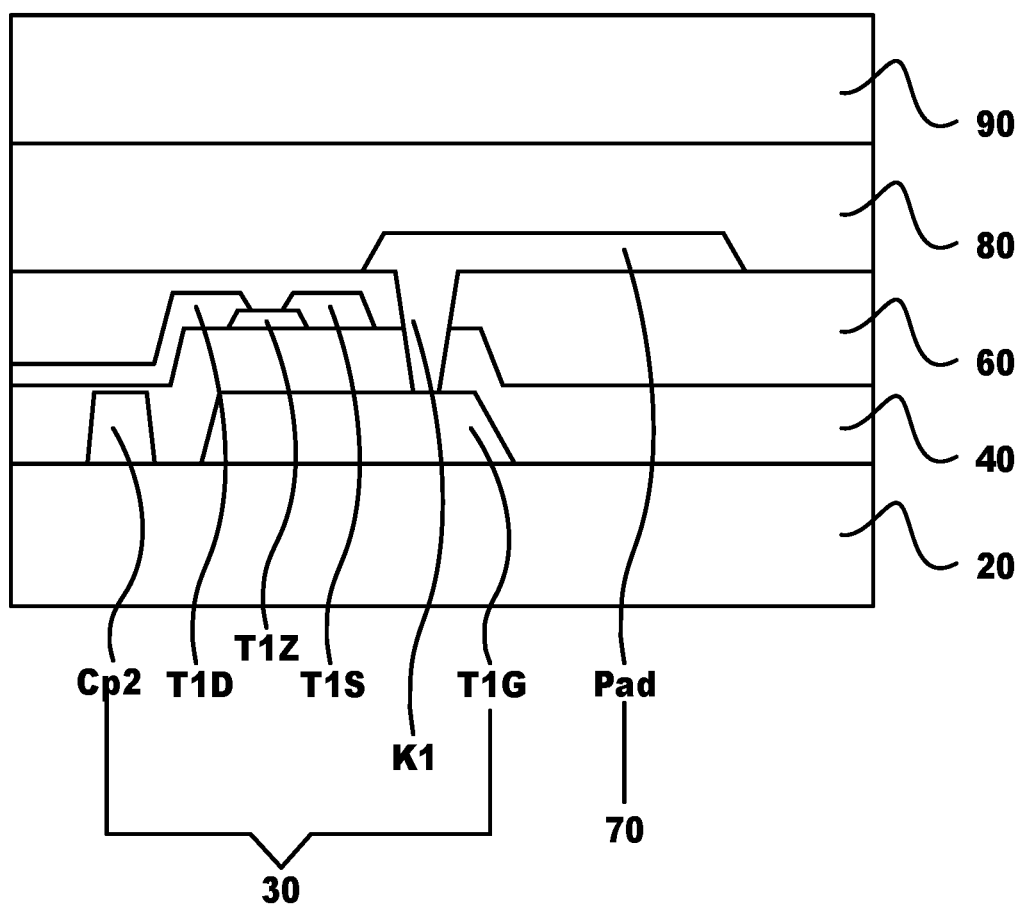
FIG. 9 is a schematic diagram of a structure of a touch unit in FIG. 8.

In detail, as shown in FIG. 8, in the touch unit 10, the touch substructure 12 includes a touch metal block Pad and a first transistor TFT1. A gate electrode of the first transistor TFT1 is electrically connected to the touch metal block Pad, and a source electrode of the first transistor TFT1 is configured to receive a corresponding touch drive signal TX. The source electrode of the first transistor TFT1 serves as a first plate of a first parasitic capacitance Cgs, the gate electrode of the first transistor TFT1 serves as a second plate of the first parasitic capacitance Cgs, and a drain electrode of the first transistor TFT1 serves as a first plate of a second parasitic capacitance Cp. As shown in FIG. 9, a second plate Cp2 of the second parasitic capacitance Cp may be a first metal block. A source electrode of the second transistor TFT2 is electrically connected to the drain electrode of the first transistor TFT1, and a gate electrode of the second transistor TFT2 is electrically connected to a corresponding one of the touch row selection lines. An inverting input terminal of the integrating amplifier module 11 is electrically connected to the drain electrode of the second transistor TFT2, a non-inverting input terminal of the integrating amplifier module 11 is configured to receive a reference voltage signal Vref, and an output terminal of the integrating amplifier module 11 is electrically connected to a corresponding one of the touch column readout lines.

In some embodiments, the integrating amplifier module 11 includes an amplifier 111 and an integrating capacitor Cint. An inverting input terminal of the amplifier 111 is electrically connected to the drain electrode of the second transistor TFT2, a non-inverting input terminal of the amplifier 111 is configured to receive the reference voltage signal Vref, and an output terminal of the amplifier 111 is electrically connected to a corresponding one of the touch column readout lines. One end of the integrating capacitor Cint is electrically connected to the inverting input terminal of the amplifier 111, and an other end of the integrating capacitor Cint is electrically connected to the output terminal of the amplifier 111.

In some embodiments, the integrating amplifier module 11 further includes a reset switch Rst. One end of the reset switch Rst is electrically connected to the one end of the integrating capacitor Cint, and an other end of the reset switch Rst is electrically connected to the other end of the integrating capacitor Cint.

The working principle of the touch unit 10 in the above embodiment is as follows. The gate electrode of the first transistor TFT1 is electrically connected to the touch metal block Pad. A first parasitic capacitance Cgs is provided between the gate electrode and the source electrode of the first transistor TFT1. When a finger touches or approaches the touch glass, a sensing capacitance Cf will increase. When the finger is far away from the touch metal block, the sensing capacitance Cf will decrease. It can be seen that a gate potential Vgate of the first transistor TFT1 is determined by a potential of the touch drive signal TX, the first parasitic capacitance Cgs, and the sensing capacitance Cf, and affects the leakage current of the first transistor TFT1.

$$Vgate = V_{TX} * Cgs/(Cgs + Cf)$$

wherein Vgate is the gate potential of the first transistor TFT1, $V_{TX}$ is the potential of the touch drive signal TX, Cgs is the first parasitic capacitance between the gate electrode and the source electrode of the first transistor TFT1, and Cf is the sensing capacitance between the touch metal block Pad and the finger. Cp is the second parasitic capacitance and may be used as a charge storage capacitance at this point. The leakage current of the first transistor TFT1 is stored in the second parasitic capacitance Cp within a certain period of time, a row is selected by the second transistor TFT2 as the row selection switch, and a quantity of electric charges is read by the integrating amplifier module 11.

It may be understood that, compared with the embodiment shown in FIG. 7, in some embodiments, the integrating amplifier module 11 is used in the process of charge detection, so that small signals can be amplified, and the system has a larger signal-to-noise ratio.

Figure 10:
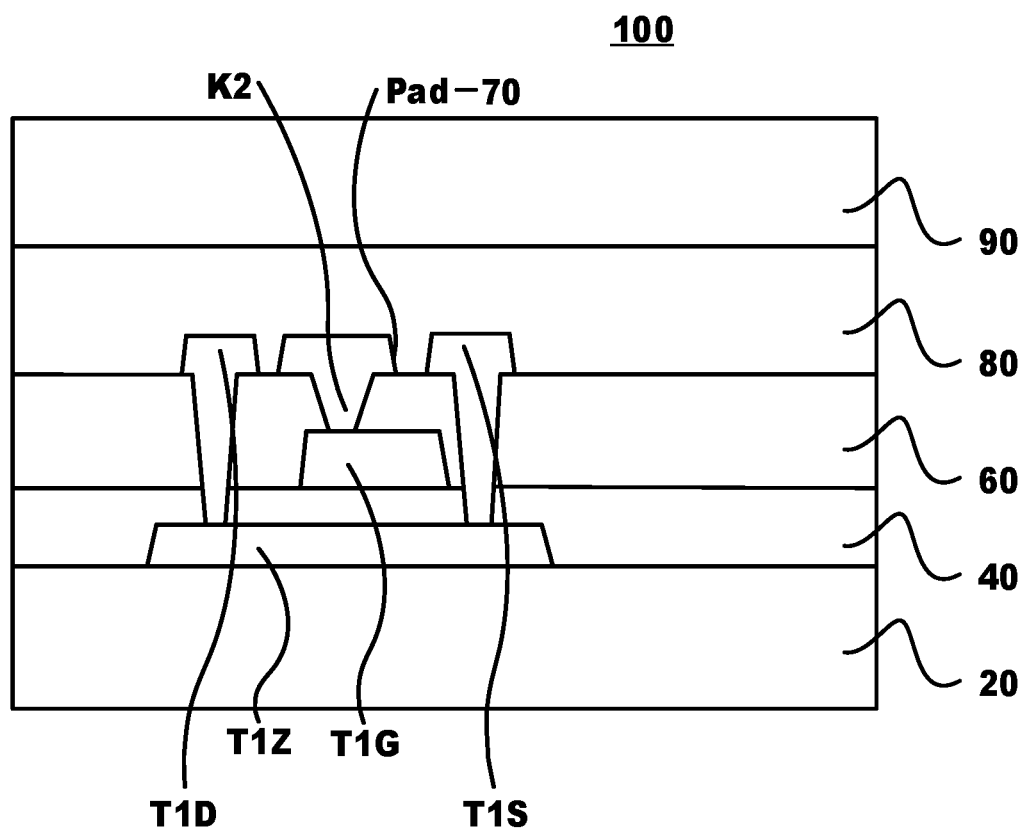
FIG. 10 is a schematic diagram of another structure of the touch unit in FIG. 8.

FIGS. 9 and 10 are schematic diagrams of two film structures corresponding to the touch metal block Pad and the first transistor TFT1 shown in the touch unit 10 shown in FIG. 8.

As shown in FIG. 9, in some embodiments, the first transistor TFT1 may use a bottom-gate structure. In detail, the touch structure 100 includes a first glass substrate 20, a first gate layer 30, a first gate insulating layer 40, a first active layer T1Z, a first source/drain layer, a second inorganic insulating layer 60, and a first metal layer 70, an optical clear adhesive (OCA) layer 80, and a second glass substrate 90.

The OCA layer 80 is a film layer formed by an OCA. The OCA is a special adhesive for bonding transparent optical elements (such as lenses, and the like), and has the characteristics of being colorless and transparent, light transmittance of above 95%, a desirable bonding strength, being curable at a room temperature or a medium temperature, and small curing shrinkage, and the like.

The first gate layer 30 includes a gate electrode T1G of the first transistor TFT1 and the second plate Cp2 of the second parasitic capacitance Cp. A projection of the second plate Cp2 of the second parasitic capacitance Cp on the first glass substrate 20 and a projection of a source electrode T1S of the first transistor TFT1 on the first glass substrate 20 at least partially overlap. The first metal layer 70 includes a touch metal block Pad. A projection of the touch metal block Pad on the first glass substrate 20 and a projection of the gate electrode T1G of the first transistor TFT1 on the first glass substrate 20 at least partially overlap.

The first source/drain layer includes the source electrode T1S and a drain electrode T1D of the first transistor TFT1.

In the present embodiment, the touch metal block Pad may be electrically connected to the gate electrode T1G of the first transistor TFT1 through a first via K1.

As shown in FIG. 10, in some embodiments, the first transistor TFT1 may also use a top-gate structure. In detail, the touch structure 100 includes the first glass substrate 20, the first active layer T1Z, the first gate insulating layer 40, the first gate layer, the second inorganic insulating layer 60, the first metal layer 70, the OCA layer 80, and the second glass substrate 90.

In the present embodiment, the touch metal block Pad may be electrically connected to the gate electrode T1G of the first transistor TFT1 through a second via K2.

The first gate layer may include the gate electrode T1G of the first transistor TFT1. The first metal layer 70 includes the source electrode T1S of the first transistor TFT1, the drain electrode T1D of the first transistor TFT1, and the touch metal block Pad.

Figure 11:
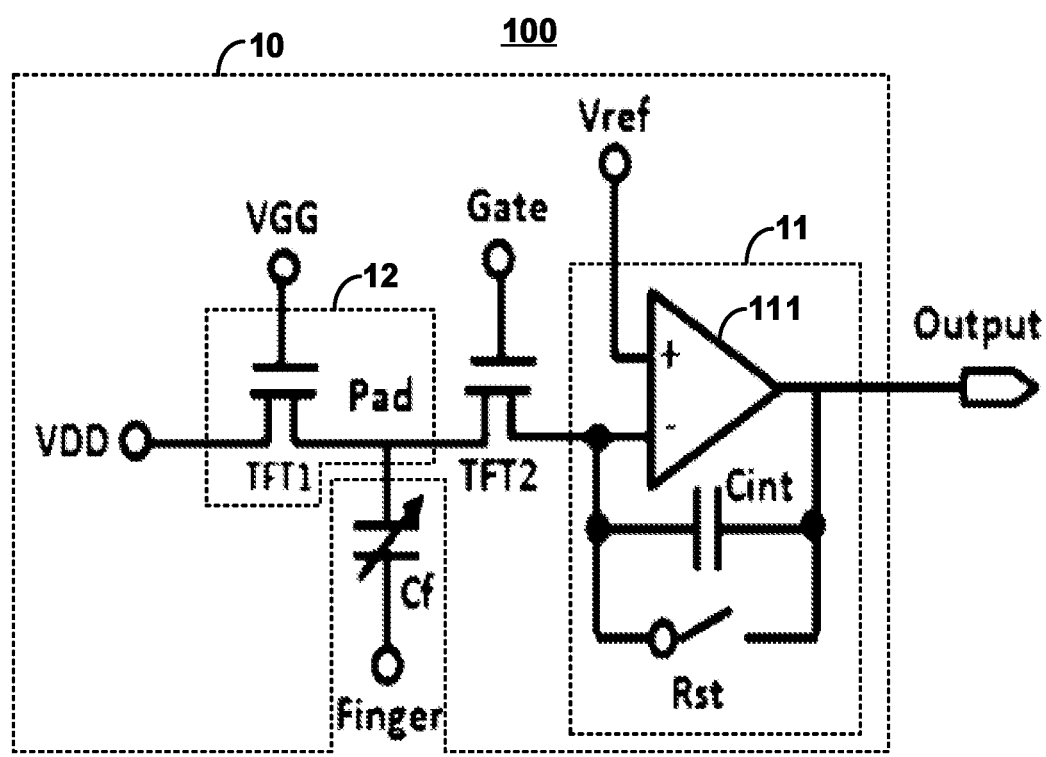
FIG. 11 is another equivalent circuit diagram of the touch unit in FIG. 7.

FIG. 11 is another equivalent circuit diagram of the touch unit 10 in other embodiments of the present invention. A difference between the circuit diagram of the touch unit 10 shown in FIG. 11 and the circuit diagram of the touch unit 10 shown in FIG. 8 is that, the first transistor TFT1 shown in FIG. 8 is an N-channel thin film transistor, and the first transistor TFT1 shown in FIG. 11 is a photosensitive transistor. In detail, as shown in FIG. 11, the gate electrode of the first transistor TFT1 is configured to sense a light-control signal VGG, the electric drive signal is a constant voltage DC signal, and the touch metal block Pad is electrically connected to the source electrode of the first transistor TFT1.

It should be noted that when the finger touches or approaches the touch metal block Pad through the glass, the sensing capacitance Cf will increase. When the finger is far away from the touch metal block, the sensing capacitance Cf will decrease. Alternatively, when the gate electrode of the first transistor TFT1 receives the light-control signal VGG, the constant voltage DC signal VDD will leak current through the first transistor TFT1, so as to realize remote light control.

Figure 12:
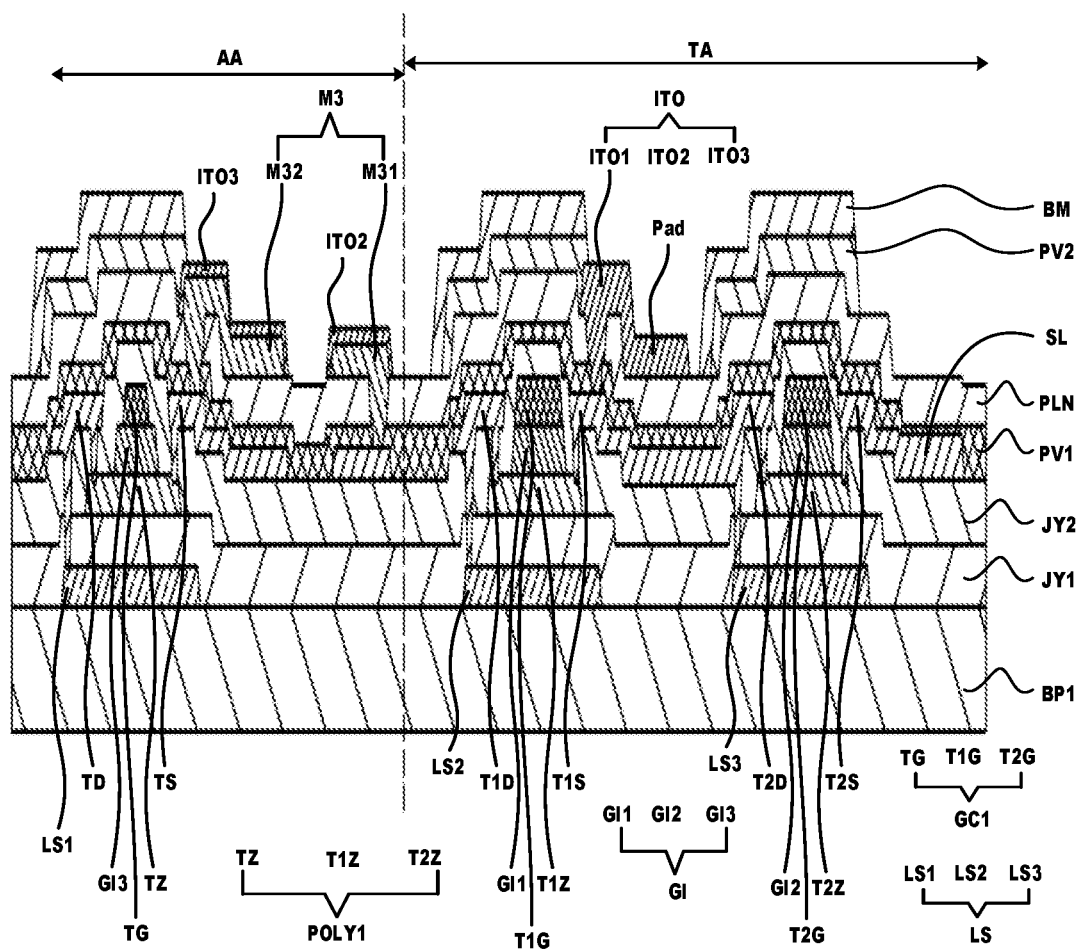
FIG. 12 is a schematic diagram of a structure of a touch display panel according to an embodiment of the present disclosure.

The present invention further provides a touch display panel. FIG. 12 is a schematic diagram of one structure of the touch display panel. In the present embodiment, the touch display panel includes a display area AA and a touch area TA and includes the touch structure described above. The touch structure is disposed in the touch area TA.

As shown in FIG. 12, in the touch display panel, the display area AA and the touch area TA are alternately distributed. A third transistor for displaying is formed in the display area AA. A first transistor and a second transistor for touch control and/or light control are formed in the touch area TA. In the present embodiment, the touch display panel is an in-cell touch display panel, and the touch layer and the display layer are simultaneously manufactured on the corresponding film layer through the touch display panel. The touch display panel may include a substrate BP1, a light-shielding metal layer LS, an insulating layer JY1, a second active layer POLY1, a second gate insulating layer GI, a second gate layer GC1, an insulating layer JY2, a second metal layer M2, an organic insulating layer PV1, a planarization layer PLN, a third metal layer M3, a transparent electrode layer ITO, an organic insulating layer PV2, and a black matrix layer BM.

The light-shielding metal layer LS may include a light-shielding metal block LS1, a light-shielding metal block LS2, a light-shielding metal block LS3, and the like that are isolated from each other. These light-shielding metal blocks and the second active layer POLY1 at least partially overlap in a thickness direction, and one of the light-shielding metal blocks is electrically connected to only the drain electrode of a corresponding one of the transistors.

The second active layer POLY1 may include a channel region TZ of the third transistor, a channel region T1Z of the first transistor, and a channel region T2Z of the second transistor.

The second gate insulating layer GI may include a gate insulating block GI3, a gate insulating block GI1, and a gate insulating block GI2.

The second gate layer GC1 may include a gate electrode TG of the third transistor, the gate electrode T1G of the first transistor, and a gate electrode T2G of the second transistor.

The second metal layer M2 may include a drain electrode TD of the third transistor, a source electrode TS of the third transistor, the drain electrode T1D of the first transistor, the source electrode T1S of the first transistor, a drain electrode T2D of the second transistor, a source electrode T2S of the second transistor, and the touch column readout lines SL.

The third metal layer M3 only exists in the display area AA. The third metal layer M3 may include a metal block M31 and a metal block M32.

The transparent electrode layer ITO may include a transparent electrode ITO1, a transparent electrode ITO2, a transparent electrode ITO3, a touch metal block Pad, and the like. The touch metal block Pad may be electrically connected to the source electrode T1S of the first transistor through the transparent electrode ITO1 and the via in sequence, and the source electrode T1S of the first transistor is electrically connected to a source connection area of the first transistor through the via. A projection of the touch metal block Pad on the second gate layer GC1 is located between the gate electrode T1G of the first transistor and the gate electrode T2G of the second transistor.

It may be understood that, in the present embodiment, the touch structure in the above embodiment and the display film layer of the display area AA can be formed in almost a same film structure, so as to reduce the thickness of the touch display panel.

The light-emitting device of the touch display panel may be covered with a layer of silica gel or a glass cover after being packaged, so as to isolate the finger from the touch metal block Pad, thereby protecting the light-emitting device and improving the sliding feeling of touch.

Figure 13:
FIG. 13 is a schematic diagram of another structure of a touch display panel according to an embodiment of the present disclosure.

FIG. 13 is a schematic diagram of another structure of the touch display panel according to the present invention. As shown in FIG. 13, in some embodiments, the touch display panel includes a display panel 200 and a touch panel. The touch panel is disposed on a light-exit side of the display panel 200 and includes the touch structure 100 in any of the above embodiments. It may be understood that, according to the touch display panel provided in the present embodiment, one of the touch column readout lines is configured using one column of the touch units 10, and only N touch column readout lines are required to read out required touch signals, thereby reducing a quantity of touch signal readout lines. In addition, one of the touch row selection lines is electrically connected to one row of the touch units 10, and the required touch signals can be read out row by row, so that only the touch signal of one touch unit 10 in the row can be read out using one of the touch column readout lines at a same moment, avoiding the ghosting.

It should be noted that the display panel 200 in the above embodiment may be a structural structure for implementing the display function. For details, refer to the above descriptions.

Based on the above, the foregoing touch structure 100 implements an active-matrix charge detection type touch technology, which can be used for on-cell touch or in-cell touch. The display panel 200 may be, but is not limited to, any of a vertical alignment (VA) display panel, an in-plane switching (IPS) display panel, an organic light-emitting diode (OLED) display panel, and a mini-LED display panel.

It should be understood that a person of ordinary skill in the art can make any form of equivalent replacement or modification according to the technical solutions and the ideas of the present disclosure, and all the modifications or the replacements should fall within the protection scope of the claims appended to the present disclosure.

What is claimed is:

1. A touch structure, comprising:
   a plurality of touch units in an array distribution;
   a plurality of touch row selection lines, wherein one of the touch row selection lines is electrically connected to one row of the touch units; and
   a plurality of touch column readout lines, wherein one of the touch column readout lines is electrically connected to one column of the touch units;
   wherein each touch unit comprises: a first transistor, wherein a source electrode of the first transistor is configured to receive a corresponding electric drive signal; a touch metal block electrically connected to a gate electrode of the first transistor or a drain electrode of the first transistor; and a second transistor, wherein a source electrode of the second transistor is electrically connected to the drain electrode of the first transistor, a gate electrode of the second transistor is electrically connected to a corresponding one of the touch row selection lines, and a drain electrode of the second transistor is electrically connected to a corresponding one of the touch column readout lines; and
   wherein the electric drive signal is a square wave touch drive signal, the touch metal block is electrically connected to the gate electrode of the first transistor, and the source electrode of the first transistor and the gate electrode of the first transistor at least partially overlap in a thickness direction of the touch structure to form a first parasitic capacitance; and the drain electrode of the first transistor and the first metal block at least partially overlap in the thickness direction of the touch structure to form a second parasitic capacitance, and the first metal block and the gate electrode of the first transistor are located in a same film layer.

2. The touch structure as claimed in claim 1, wherein the gate electrode of the first transistor and the first metal block are formed in a first gate layer, the touch metal block is formed in a first metal layer, and the touch metal block and the gate electrode of the first transistor at least partially overlap in the thickness direction.

3. The touch structure as claimed in claim 1, wherein the first transistor is a photosensitive transistor, the gate electrode of the first transistor is configured to sense a light-control signal, the electric drive signal is a constant voltage direct current (DC) signal, and the touch metal block is electrically connected to the source electrode of the first transistor.

4. The touch structure as claimed in claim 3, wherein the gate electrode of the first transistor and the gate electrode of the second transistor are formed in a second gate layer;
   the drain electrode of the first transistor, the source electrode of the first transistor, the drain electrode of the second transistor, the source electrode of the second transistor, and the touch column readout lines are formed in a second metal layer;
   the touch metal block is formed in a transparent electrode layer; and a projection of the touch metal block on the second gate layer is located between the gate electrode of the first transistor and the gate electrode of the second transistor.

5. The touch structure as claimed in claim 4, further comprising:
   a light-shielding metal layer comprising a plurality of light-shielding metal blocks isolated from each other, wherein the light-shielding metal blocks and a second active layer at least partially overlap in a thickness direction of the touch structure, and one of the light-shielding metal blocks is electrically connected to the drain electrode of the first transistor or the drain electrode of the second transistor.

6. The touch structure as claimed in claim 1, wherein the touch unit further comprises:
   an integrating amplifier module, wherein an inverting input terminal of the integrating amplifier module is electrically connected to the source electrode of the second transistor, a non-inverting input terminal of the integrating amplifier module is configured to receive a reference voltage signal, and an output terminal of the integrating amplifier module is electrically connected to a corresponding one of the touch column readout lines.

7. The touch structure as claimed in claim 6, wherein the integrating amplifier module comprises:
   an amplifier, wherein an inverting input terminal of the amplifier is electrically connected to the source electrode of the second transistor, a non-inverting input terminal of the amplifier is configured to receive the reference voltage signal, and an output terminal of the amplifier is electrically connected to a corresponding one of the touch column readout lines;
   an integrating capacitor, wherein one end of the integrating capacitor is electrically connected to the inverting input terminal of the amplifier, and another end of the integrating capacitor is electrically connected to the output terminal of the amplifier; and
   a reset switch, wherein one end of the reset switch is electrically connected to the one end of the integrating capacitor, and another end of the reset switch is electrically connected to the another end of the integrating capacitor.

8. A touch display panel, comprising a touch structure, the touch structure comprising:
   a plurality of touch units in an array distribution;
   a plurality of touch row selection lines, wherein one of the touch row selection lines is electrically connected to one row of the touch units; and
   a plurality of touch column readout lines, wherein one of the touch column readout lines is electrically connected to one column of the touch units;
   wherein each touch unit comprises: a first transistor, wherein a source electrode of the first transistor is configured to receive a corresponding electric drive signal; a touch metal block electrically connected to a gate electrode of the first transistor or a drain electrode of the first transistor; and a second transistor, wherein a source electrode of the second transistor is electrically connected to the drain electrode of the first transistor, a gate electrode of the second transistor is electrically connected to a corresponding one of the touch row selection lines, and a drain electrode of the second transistor is electrically connected to a corresponding one of the touch column readout lines; and
   wherein the electric drive signal is a square wave touch drive signal, the touch metal block is electrically connected to the gate electrode of the first transistor, and the source electrode of the first transistor and the gate electrode of the first transistor at least partially overlap in a thickness direction of the touch structure to form a first parasitic capacitance; and the drain electrode of the first transistor and the first metal block at least partially overlap in the thickness direction of the touch structure to form a second parasitic capacitance, and the first metal block and the gate electrode of the first transistor are located in a same film layer.

9. The touch display panel as claimed in claim 8, comprising a display area and a touch area that are alternately distributed, wherein the touch structure is disposed in the touch area.

10. The touch display panel as claimed in claim 8, comprising a display panel and a touch panel, wherein the touch panel is disposed on a light-exit side of the display panel and comprises the touch structure.

11. The touch display panel as claimed in claim 8, wherein the gate electrode of the first transistor and the first metal block are formed in a first gate layer; the touch metal block is formed in a first metal layer, and the touch metal block and the gate electrode of the first transistor at least partially overlap in the thickness direction.

12. The touch display panel as claimed in claim 8, wherein the first transistor is a photosensitive transistor, the gate electrode of the first transistor is configured to sense a light-control signal, the electric drive signal is a constant voltage DC signal, and the touch metal block is electrically connected to the source electrode of the first transistor.

13. The touch display panel as claimed in claim 12, wherein the gate electrode of the first transistor and the gate electrode of the second transistor are formed in a second gate layer;
   the drain electrode of the first transistor, the source electrode of the first transistor, the drain electrode of the second transistor, the source electrode of the second transistor, and the touch column readout lines are formed in a second metal layer;
   the touch metal block is formed in a transparent electrode layer; and a projection of the touch metal block on the second gate layer is located between the gate electrode of the first transistor and the gate electrode of the second transistor.

14. The touch display panel as claimed in claim 13, wherein the touch structure further comprises:
   a light-shielding metal layer comprising a plurality of light-shielding metal blocks isolated from each other, wherein the light-shielding metal blocks and a second active layer at least partially overlap in a thickness direction of the touch structure, and one of the light-shielding metal blocks is electrically connected to the drain electrode of the first transistor or the drain electrode of the second transistor.

15. The touch display panel as claimed in claim 8, wherein the touch unit further comprises:
   an integrating amplifier module, wherein an inverting input terminal of the integrating amplifier module is electrically connected to the source electrode of the second transistor, a non-inverting input terminal of the integrating amplifier module is configured to receive a reference voltage signal, and an output terminal of the integrating amplifier module is electrically connected to a corresponding one of the touch column readout lines.

16. The touch display panel as claimed in claim 15, wherein the integrating amplifier module comprises:
   an amplifier, wherein an inverting input terminal of the amplifier is electrically connected to the source electrode of the second transistor, a non-inverting input terminal of the amplifier is configured to receive the reference voltage signal, and an output terminal of the amplifier is electrically connected to a corresponding one of the touch column readout lines;
   an integrating capacitor, wherein one end of the integrating capacitor is electrically connected to the inverting input terminal of the amplifier, and another end of the integrating capacitor is electrically connected to the output terminal of the amplifier; and
   a reset switch, wherein one end of the reset switch is electrically connected to the one end of the integrating capacitor, and another end of the reset switch is electrically connected to the another end of the integrating capacitor.

* * * * *